United States Patent [19]
Fushiya et al.

[11] Patent Number: 4,527,380
[45] Date of Patent: Jul. 9, 1985

[54] LAWN MOWER

[75] Inventors: Fusao Fushiya; Nobuhiro Inoue; Setsuo Saito, all of Anjo, Japan

[73] Assignee: Makita Electric Works, Ltd., Aichi, Japan

[21] Appl. No.: 530,010

[22] Filed: Sep. 7, 1983

[30] Foreign Application Priority Data

May 31, 1983 [JP] Japan .................. 58-83305
Aug. 9, 1983 [JP] Japan .................. 58-124273

[51] Int. Cl.$^3$ .................................. A01D 35/26
[52] U.S. Cl. .................................. 56/12.8; 56/17.1; 411/535; 411/546
[58] Field of Search .............. 56/12.6, 12.8, 255, 56/295, 17.1; 411/531, 535, 546

[56] References Cited

U.S. PATENT DOCUMENTS 3,452,523  7/1969  Svensson .................. 56/12.8
4,015,407  4/1977  Bacon .................. 56/12.6
4,276,737  7/1981  Henning .................. 56/12.8

Primary Examiner—Gene Mancene
Assistant Examiner—David I. Tarnoff
Attorney, Agent, or Firm—Dennison, Meserole, Pollack & Scheiner

[57] ABSTRACT

Disclosed herein is a lawn mower including a motor housing for vertically enclosing a motor; and a cutter casing disposed below the motor housing for housing a cutter fitted to the lower extremity of the shaft of the motor. The cutter casing is connected to the motor housing in such a manner that they communicate with each other. The cutter casing has at the upper portion thereof air-passing ports vertically extending therethrough. There is provided on the cutter casing a shroud for enclosing the motor housing, and the shroud has at a portion thereof apertures opening to communicate with the atmosphere; and air inlets opening to communicate through an air filter with the interior of the motor housing. In the cutter casing and above the cutter, there are provided an air impeller for creating a flow of air to support the mower on a cushion of air; and an axial impeller for cooling the motor. Both impellers are fitted to the motor shaft such that the axial impeller overlies the air impeller. The air impeller is adapted to draw air through the apertures and the air-passing ports to generate an air cushion in conjunction with said cutter casing. The axial impeller is adapted to create an air flow streaming down in the motor housing through the air inlets so as to cool the motor.

3 Claims, 9 Drawing Figures

LAWN MOWER

BACKGROUND OF THE INVENTION

The present invention relates to a lawn mower.

In general, lawn mowers must meet the following requirements: First, they must be operated smoothly during grass cutting, and second, they must be so designed as to prevent overheating of the motor for driving a cutter.

In a prior art lawn mower, vibration produced during grass cutting as well as vibration caused by irregular rotational balance (imbalance) of each of the rotating components such as a cutter, motor, fan or blower and resonance among the components are propagated to the operator to hinder good performance and operation of the machine. Furthermore, the vibrations are accompanied with noises which will give unpleasant feeling to the operator. As the result, such a mower requires awkward maintenance labor for keeping rotational balance of each rotating component, for example, for adjusting rotational balance of the cutter at every time after polishing, and troublesome labor for assuring assembly precision of the components. Furthermore, when the cutter strikes stones or the like during grass cutting, the operator will disadvantageously suffer from strong shocks.

SUMMARY OF THE INVENTION

In accordance with the present invention, a novel lawn mower is provided which meets the above requirements and which eliminates the above disadvantages. The inventive lawn mower comprises a motor housing vertically enclosing a motor; and a cutter casing disposed below the motor housing for housing a cutter fitted to the lower extremity of the shaft of the motor. The cutter casing is connected to the motor housing in such a manner that they communicate with each other. The cutter casing has at the upper portion thereof air-passing ports vertically extending therethrough. There is provided on the cutter casing a shroud for enclosing the motor housing, and the shroud has at a portion thereof apertures opening to communicate with the atmosphere and air inlets opening to communicate through an air filter with the interior of the motor housing. In the cutter casing and above the cutter, there are provided an air impeller for creating a flow of air to support the mower on a cushion of air; and an axial impeller for cooling the motor. Both impellers are fitted to the motor shaft such that the axial impeller overlies the air impeller. The air impeller is adapted to draw air through the apertures and air-passing ports to generate an air cushion in conjunction with the cutter casing. The axial impeller is adapted to create an air flow streaming down in the motor housing through the inlets so as to cool the motor.

In another arrangement, the shaft of the motor is rotatably supported at the lower end portion thereof by a bracket provided adjacent to the lower end of the motor housing. The bracket is connected to the top of the cutter casing through an appropriate number of vibration insulating members which are elastically deformably formed.

It is an object of the present invention to provide a lawn mower which can be smoothly operated during grass cutting by virtue of the cushion of air produced by an air impeller during rotation.

Another object of the present invention is to provide a lawn mower having an axial impeller which exclusively functions as a fan for cooling the motor so as to positively prevent overheating of the motor.

A further object of the present invention is to provide a lawn mower which can alleviate and absorb the vibration generated during rotation of the rotating components, the shock applied to the cutter and the like, and reduce the noises caused by resonance.

The present invention will become more fully apparent from the claims and description as it proceeds in connection with the drawings.

DETAILED DESCRIPTION OF THE INVENTION

Figure 1:
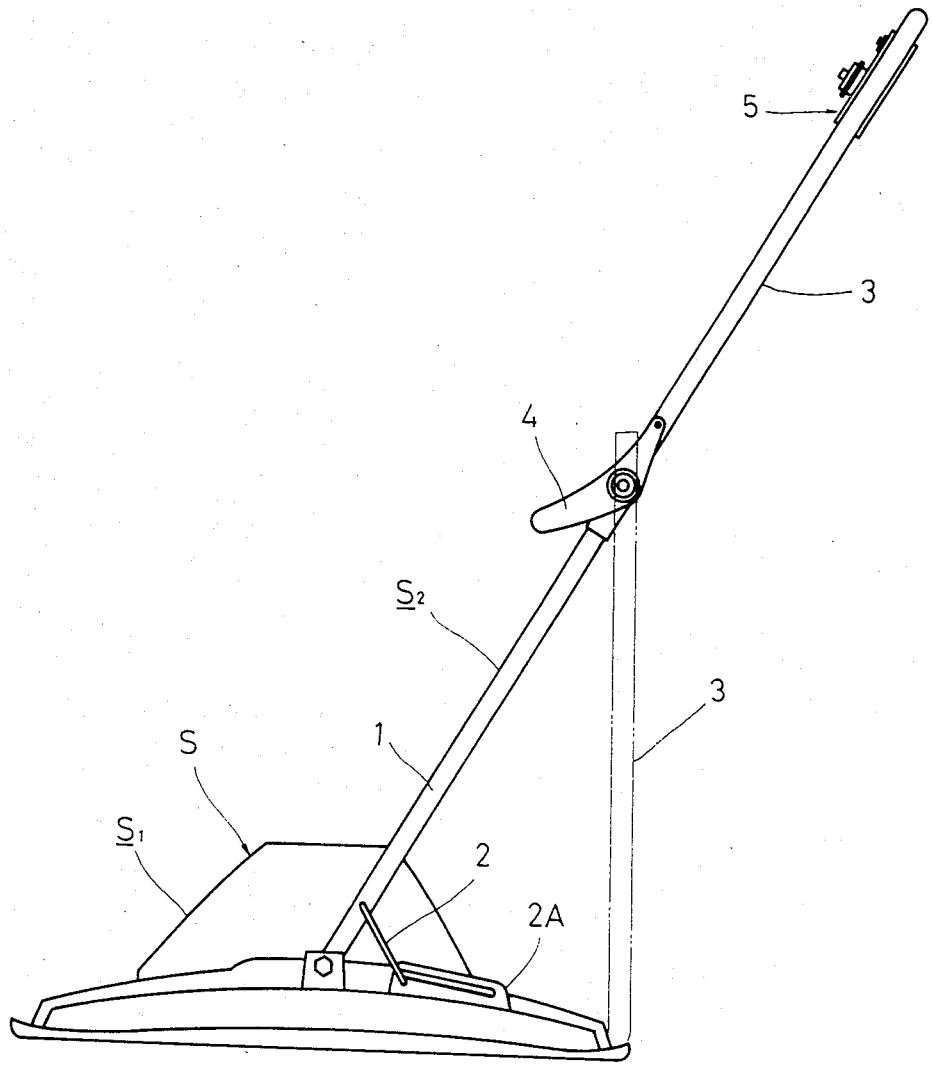
FIG. 1 is a side elevational view of a lawn mower according to an embodiment of the present invention.

Referring now to FIGS. 1 to 6 in which a preferred embodiment of the present invention is shown, a lawn mower S is composed of an operating structure $S_1$ for performing grass cutting and a supporting structure $S_2$ for supporting the operating structure $S_1$.

The supporting structure $S_2$ has a lower handle 1 made of a metallic pipe member and pivotally secured to each side of the operating structure $S_1$. A lock arm 2 is provided at a lower portion of the lower handle 1, and slidingly movable along a slide piece 2A attached to the operating structure $S_1$ so as to hold the lower handle 1 at a desired angle between the lying position and the standing position at a predetermined angle. There is provided an upper handle 3 made of a metallic pipe member and connected to the lower handle 1 in such a manner as to be folded against the lower handle 1. A lock piece 4 is secured through a pin to the upper handle 3 and adapted to lock and release the two handles 1 and 3.

Figure 2:
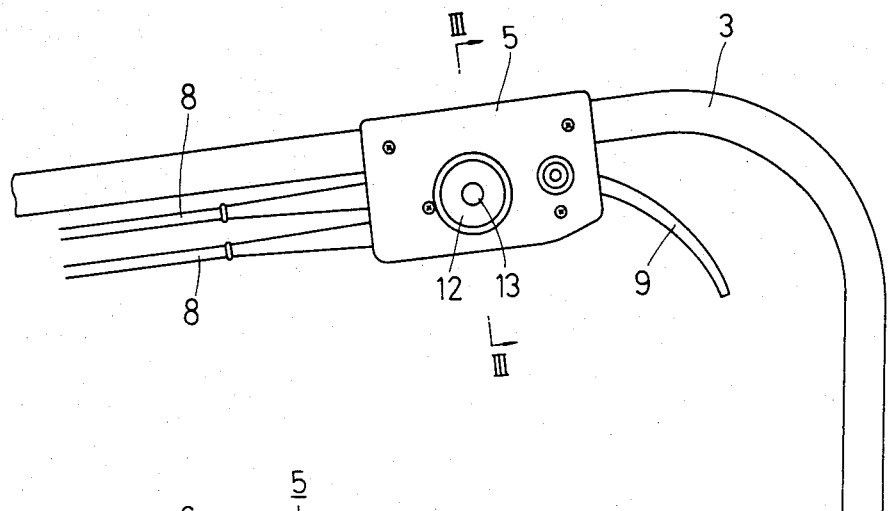
FIG. 2 is a front view of a switch box of the lawn mower.

A switch box 5 is carried on the upper handle 3 at its one upper side and adapted for on-off control of an electric motor 26 (see FIG. 2). The switch box 5 is open to the right and left (as viewed in FIG. 3) and is composed of a pair of halves of a first box 5A and a second box 5B. When the two boxes 5A and 5B are assembled, a first chamber 6 and a second chamber 7 are defined in the switch box 5. The first chamber 6 is adapted to tightly hold the upper handle 3 therethrough, and the switch box 5 is fixed to the upper handle 3 through screw means. A switch structure (not shown) is encased in the second chamber 7 and connected to the electric motor 26 through a lead wire 8. The switch structure is provided with a control lever 9 and the electric motor 26 is switched on or off by grip action of the control lever 9. The control lever 9 is provided with return means (not shown) for grip action.

Figure 3:
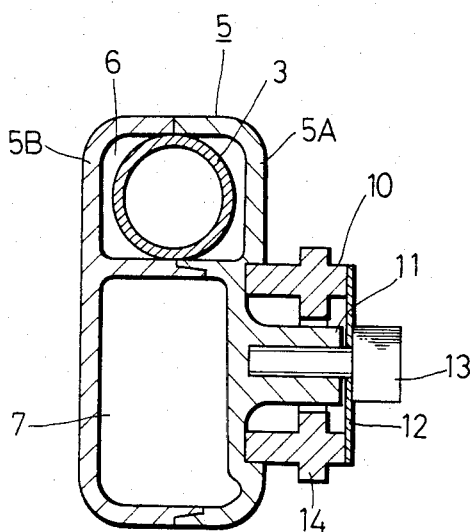
FIG. 3 is a sectional view taken along line III—III of FIG. 2.
Figure 5:
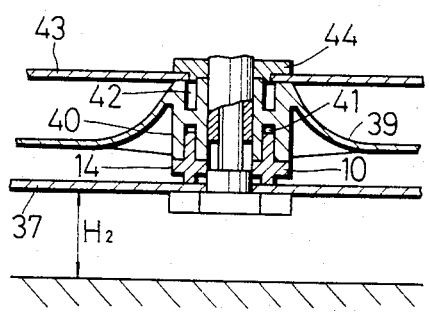
FIGS. 5 and 6 are enlarged fragmentary sectional views illustrating different mounting ways of a spacer for use with the lawn mower.
Figure 6:
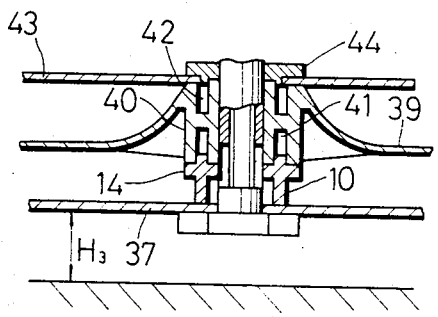

The switch box 5, further has a space for receiving a spacer 10 so as to prevent loss of the same when not in use (see FIG. 3). The spacer 10 is adapted to adjust the grass cutting height, and is removably interposed between an air impeller 39 and a cutter 37 which will be described later. The first box 5A of the switch box 5 has at the medial portion thereof a mounting boss 11 integrally formed therewith and protruding almost the same height as the spacer 10. The spacer 10 is held around the boss 11 and tightened with a bolt 13 through a washer 12. The spacer 10 has an engaging ridge 14 and a long leg and a short leg extending from the engaging ridge 14 in the opposite directions.

Now, the operating structure $S_1$ will be described with reference to FIG. 4. Numeral 15 indicated a cutter casing adapted for encasing a cutter 37 and other components. The cutter casing 15 is an inverted dish-shaped member downwardly opening and the lower extremety thereof is bent upwardly to form a reinforcing flange edge 16. The cutter casing 15 has at the central portion thereof a cylindrical connecting boss 17 integrally formed therewith and extending downwardly from the top thereof. The cutter casing 15 has a series of air-passing ports 18 defined about the periphery of the connecting boss 17. Mounted coaxially on the cutter casing 15 is an inverted cup-shaped shroud 19 secured by an appropriate number of bolts. The shroud 19 has around the medial portion of the side wall thereof an appropriate number of elongated apertures 21 extending along the periphery thereof and communicating with the atmosphere. The shroud 19 has air inlets 22 spaced above the apertures 21 and communicating through an air filter 24 with the interior of a motor housing 23 which will be mentioned later.

The electric motor 26 and the motor housing 23 are suspended as a unit through a connecting piece 25 in the shroud 19. The motor housing 23 has an open top and an open bottom and is carried on the opening top of the connecting boss 17 of the cutter casing 15 in such a way as to substantially coaxially communicate with the cutter casing 15.

The electric motor 26 is substantially coaxially and vertically mounted within the motor housing 23. There are provided a first bracket 29 fixedly connected to the connecting boss 17 of the cutter casing 15 through bolt means 28 and a second bracket 31. The motor 26 has a field iron core 27 which in turn is supported by the first bracket 29 and the second bracket 31 fixedly connected by a clamping bolt 30 to the first bracket 29. The motor shaft 32 is supported at the upper and lower portions thereof by the first and second brackets 29 and 31 through bearings 33 and 34, respectively. A cap 35 is put on the upper end of the motor shaft 32. There is provided on the top of the shroud 19 an inspection hole 36 through which operating condition of the motor 26 can be visually checked. On the other hand, the lower portion of the motor shaft 32 extends toward the bottom of the cutter casing 15. The cutter 37, having at the peripheral edge thereof a cutting edge, is attached to the extreme end of the motor shaft 32 by a clamp 38.

Mounted coaxially on the motor shaft 32 above the cutter 37 is an air impeller 39 having a diameter smaller than the cutter 37. The air impeller 39 has vanes 39A adjacent to the air-passing ports 18 of the cutter casing 15 so as to assist flow of air through the air-passing ports 18. When the impeller 39 is rotated during running of the motor 26, the vanes 39A serve to draw air through the apertures 21 in the shroud 19, and the intaked air passes the air-passing ports 18 into the cutter casing 15. Such a flow of air produces in the cutter casing 15 a cushion of air to support the entire operational structure $S_1$. The mounting shank, as at 40, of the air impeller 39 has at the lower end thereof a mounting groove 41 for removably receiving either of the long or short leg of the spacer 10. In this embodiment a groove 42 similar to the groove 41 is provided at the upper end of the mounting shank 40 so as to make the wall thickness of the air impeller 39 substantially uniform for improved reinforcement.

Furthermore, an axial impeller 43 for exclusively cooling the electric motor 26 is coaxially fitted on the motor shaft 32 above the air impeller 39. The assembly of the axial impeller 43, the air impeller 39 and the cutter 37 is held between the clamp 38 and a junk ring 44. (The spacer 10 may be interposed between the cutter 37 and the air impeller 39.)

The axial impeller 43 is disposed within the tapered portion 45 formed at the lower portion of the connecting boss 17, and has a plurality of vanes 43A provided around the periphery thereof. The vanes 43A are so positioned as to be inside of the vanes 39A of the air impeller 39. The axial impeller 43 is disposed in opposing relation to a cooling air outlet 46 located below the motor 26. During running of the motor 26, the axial-flow impeller 43 draws air through the air inlets 22 of the shroud 19 and the air filter 24 into the motor housing 23. Then, the air axially flows down in the motor housing 23 to generate an axial flow of air for solely cooling the motor 26.

Now the operation of the mower thus constructed is as follows. For the mower S, preliminary adjustment of grass cutting height is carried out prior to grass cutting operation. When the spacer 10 is unemployed (as shown in FIG. 4), the height of the cutter 37 from the ground is $H_1$, which is the maximum setting height of the cutter 37 in the mower S.

In case the grass cutting height is to be changed, the spacer 10 is mounted to the motor shaft 32. For this purpose, the bolt 13 of the switch box 5 is loosened to remove the spacer 10 from the switch box 5. The clamp 38 is loosened to remove the cutter 37. The spacer 10 is mounted in place, and then the cutter 37 is reset through the clamp 38 for a different grass cutting height. When the long leg extending from the engaging ridge 14 of the spacer is inserted into the mounting groove 41, the grass cutting height becomes $H_2$ (see FIG. 5) and on the contrary when the short leg is inserted, the grass cutting height of $H_3$ is obtained (see FIG. 6). Thus, in this embodiment, two kinds of grass cutting height can be obtained by selectively changing the mounting direction of the spacer 10, and if the spacer 10 is unemployed, three kinds of grass cutting height are obtainable. Furthermore, as the space for storing the unemployed spacer 10 is provided in the switch box 5 in this embodiment, any possible loss of the spacer 10 can be avoided.

After the above adjustment, the upper handle 3 is held, the control lever 9 gripped and the motor 26 actuated for grass cutting. At this time, the cutter 37, the air impeller 39 and the axial impeller 43 are rotated together at the same speed.

Figure 4:
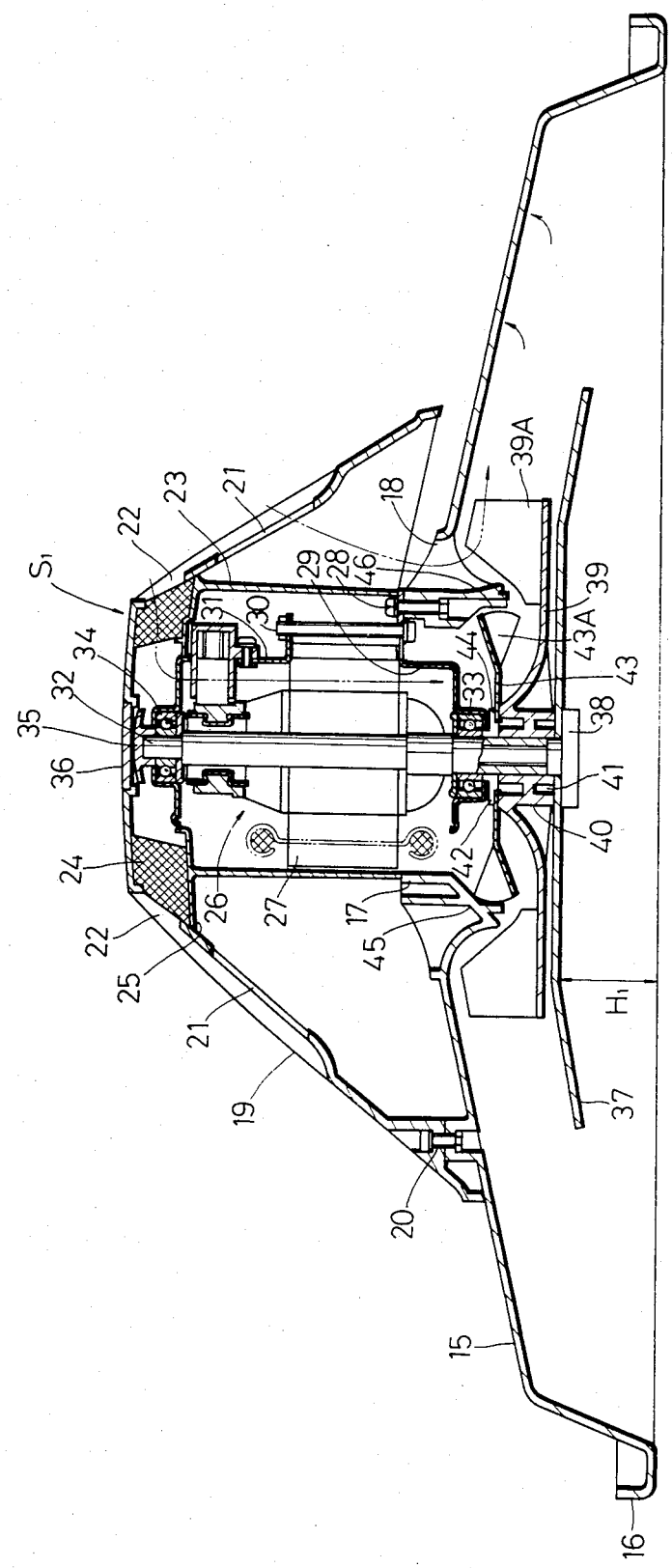
FIG. 4 is a vertical sectional view of the operating structure of the lawn mower.

During rotation of the air impeller 39, air is drawn, as mentioned above, through the apertures 21 and the air-passing ports 18 into the cutter casing 15 to generate a flow of air, as shown by a broken line in FIG. 4, for producing a cushion of air. Now, the entire operational structure $S_1$ is supported on the cushion of air. When the upper handle 3 is manipulated in such a state, grass cutting can be effected at a desired height by the cutter 37 with ease of maneuver for smooth operation.

On the other hand, when the axial impeller 43 is rotated during running of the motor 26, air is drawn, as mentioned above, through the inlets 22 and the air filter 24 to generate a flow of air axially streaming down in the motor housing 23, as is shown by another broken line in FIG. 4. This flow of air serves to exclusively cool the motor 26 so as to prevent overheating of the motor 26.

The mower S of this embodiment includes two impellers which are imparted their individual functions; one for supporting the operational structure $S_1$ on a cushion of air and the other for cooling the motor 26. Thus, the individual functions can be performed positively. More specifically, the most important feature of the present invention resides in the arrangement in which the axial impeller 43 for drawing a flow of motor cooling air is formed independently of the air impeller 39 for drawing a flow of air to create an air cushion. Accordingly, the axial impeller 43 for cooling the motor can be comparatively larger and yet positioned close to the motor. Thus, if the cutter 37 decreases its speed owing to a resistance during grass cutting, the axial impeller 43 will be able to positively accomplish its function, the motor cooling operation. Furthermore, stones or the like which may be sucked by the air impeller 39 during grass cutting will not concurrently damage the two impellers, and consequently repairs can be done by replacing only the damaged one.

In this embodiment, pivotal releasement of the lock piece 4 causes the upper handle 3 to be folded, and sliding releasement of the lock arm 2 causes the lower handle 1 to be folded, and as the result, the whole mower S can be stored compactly.

Figure 7:
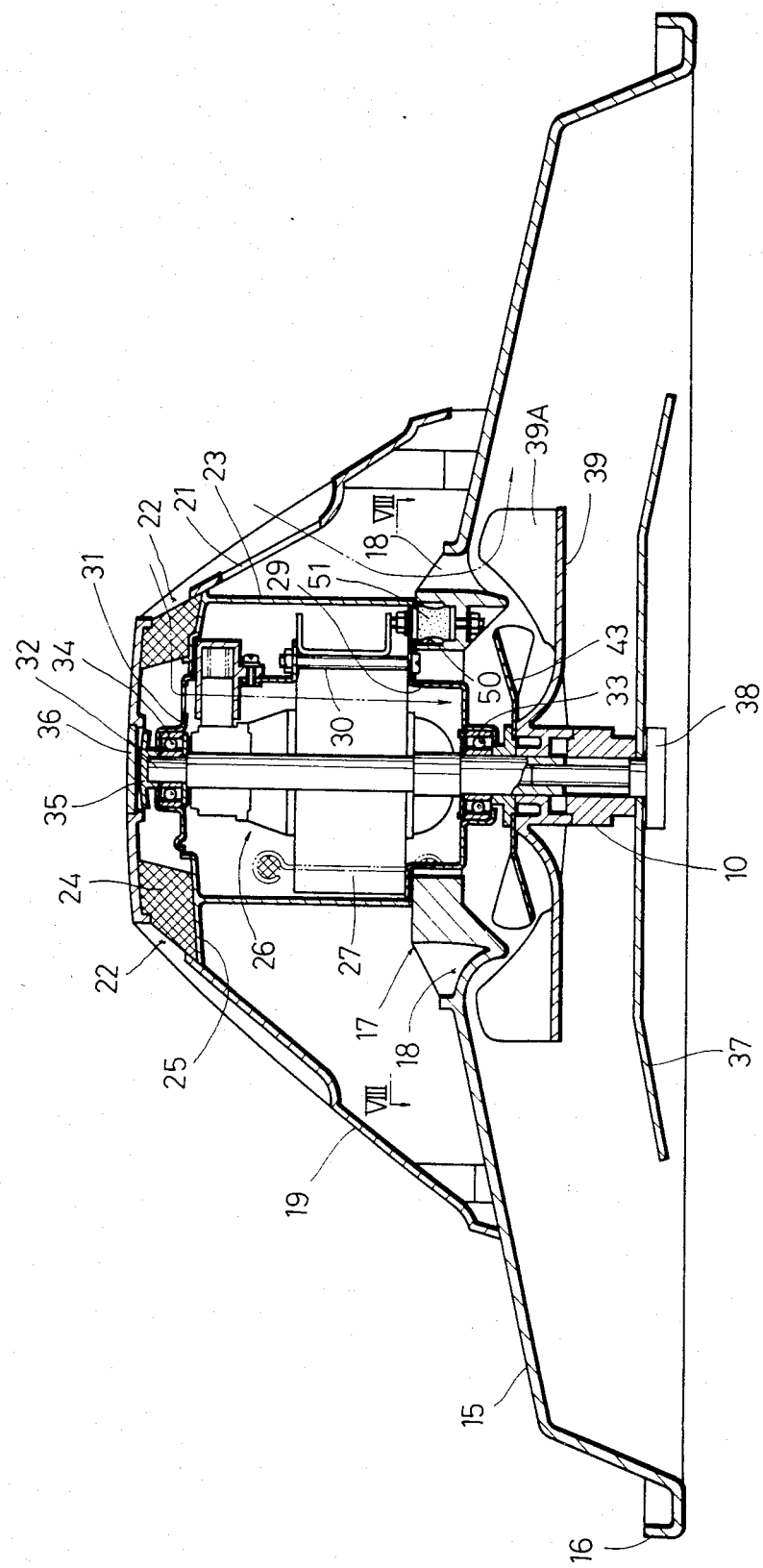
FIG. 7 is a vertical sectional view of the operating structure incorporating another embodiment of the present invention.
Figure 8:
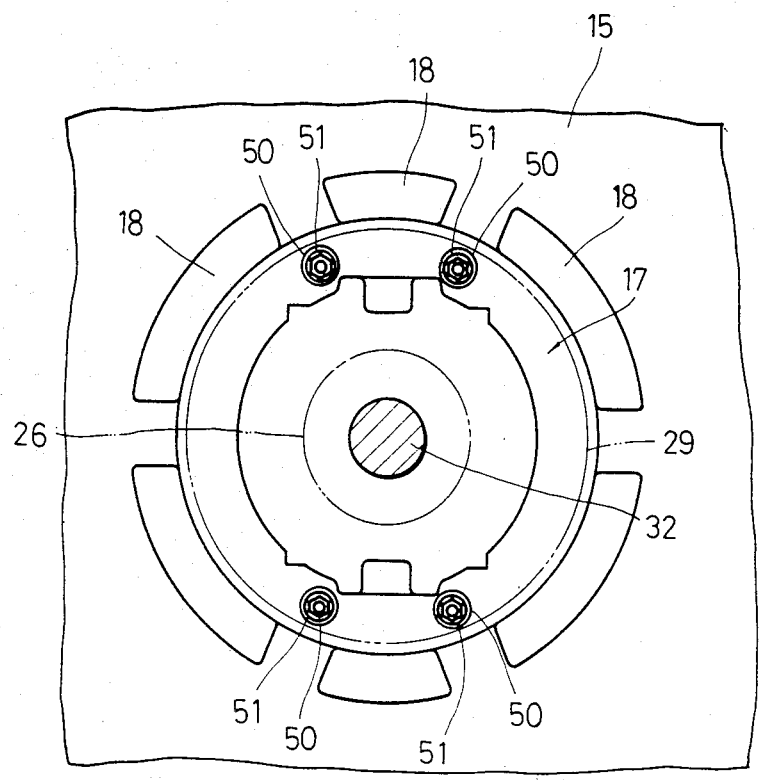
FIG. 8 is a view looking in the direction of the arrows VIII—VIII in FIG. 7.
Figure 9:
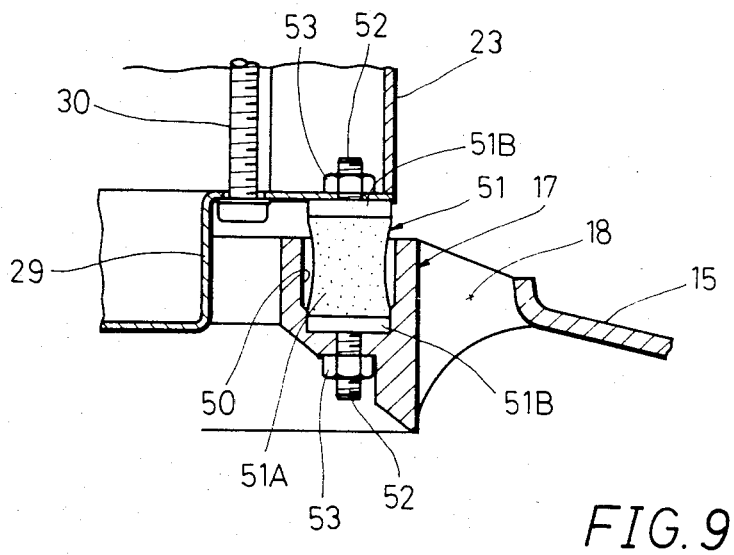
FIG. 9 is an enlarged sectional view of the essential parts of FIG. 7.

Referring now to FIGS. 7 to 9, and FIG. 7 in particular, there is shown another embodiment to the invention, the same as that of FIG. 4 insofar as the two impellers are concerned, but employing a plurality of vibration insulating members disposed generally in the region between the lower end of the motor housing and the top of the cutter casing. Like parts are given like reference numbers.

The first bracket 29 is elastically movably connected relative to the cutter casing 15 at the top portion thereof through a plurality of vibration insulating members 51 (see FIG. 8). Each of the vibration insulating members 51 is composed of a substantially cylindrical buffer piece 51A made of rubber and the like and a pair of upper and lower connecting plates 51B (see FIG. 9). The buffer piece 51A is elastically deformable, and when the buffer piece 51A is formed, the upper and the lower connecting plates 51B are fixedly connected to the buffer piece 51A at the upper and lower ends thereof, respectively. The cutter casing 15 has fitting holes 50 at an appropriate number of locations in the circumferential direction (see FIG. 8). The vibration insulating member 51 is loosely received in and partially protruding out of the fitting hole 50. The vibration insulating member 50 is fixedly connected to the outermost end of the first bracket 29 and to the connecting boss 17 of the cutter casing 15 through bolts 52, which are provided at the upper and lower connecting plates 51B, and nuts 53.

The first bracket 29 may undergo, during grass cutting, vibration of the motor 26, vibration caused by imbalance of rotating components such as of the axial impeller 43, air impeller 39 and cutter 37 and impacting force applied to the cutter 37 during grass cutting. Owing to the above construction, however, such vibrations and impact are effectively alleviated or absorbed by the vibration insulating members 51, and will not be propagated to the cutter casing 15, and as the result, such a construction can avoid any possibility of propagation of such vibrations and impacting force to the operator through the supporting structure $S_2$.

Furthermore, as the vibrations are absorbed, noises to be caused together with the vibrations can be effectively reduced.

While the invention has been described with reference to preferred embodiments thereof, it is to be understood that modifications or variations may be easily made without departing from the scope of this invention which is defined by the appended claims.

What is claimed is:

1. A lawn mower comprising:
a motor having a motor shaft;
a motor housing vertically enclosing said motor therein;
a cutter rotatably secured to said motor shaft of said motor;
a cutter casing connected to the lower end of said motor housing in communicating relation to said motor housing and housing said cutter therein;
a shroud mounted on said cutter casing and enclosing said motor housing therein;
an axial impeller secured to said motor shaft above said cutter for creating a flow of air for cooling said motor;
an air impeller secured to said motor shaft below said axial impeller and above said cutter for drawing a flow of air to create an air cushion in conjunction with said cutter casing, said air impeller having a shank portion surrounding said motor shaft with a mounting groove defined in the lower end thereof and opening downward toward the underlying cutter; and
a spacer surrounding said motor shaft and removably interposed between said cutter and said air impeller, said spacer having axially aligned and opposed end portions with projecting ridge means between said end portions and axially offset whereby said end portions are of unequal length and define a long leg and a short leg, said mounting groove being of a predetermined depth, said long leg and said short leg each being selectively received in said mounting groove and each being of a length less than the depth of said groove, said projecting ridge means limiting insertion of each leg by engagement of said projecting ridge means against said shank portion, whereby said spacer, through a selective mounting thereof, provides for an adjustment of the height of said cutter.

2. A lawn mower as defined in claim 1 further comprising a bracket provided adjacent to the lower end of said motor housing and rotatably supporting the lower end of said motor shaft; and a plurality of vibration insulating members provided on the top of said cutter casing, said vibration insulating members being elastically deformably formed, and means elastically movable connecting said bracket to the top of said cutter casing through said vibration insulating members.

3. A lawn mower as defined in claim 1 wherein said spacer is of a tubular configuration with said projecting ridge means defining an annular enlargement thereabout, said long leg and said short leg comprising tubular extensions from said ridge means, said mounting groove being annular for the selective complete reception of the legs therein.

* * * * *